United States Patent [19]
Kim

[11] Patent Number: 5,413,398
[45] Date of Patent: May 9, 1995

[54] ROOF MOLDING ASSEMBLY STRUCTURE FOR AN AUTOMOBILE

[75] Inventor: Choong Y. Kim, Kyungsangnam-do, Rep. of Korea

[73] Assignee: Hyundai Motor Co., Ltd., Seoul, Rep. of Korea

[21] Appl. No.: 148,087

[22] Filed: Nov. 4, 1993

[30] Foreign Application Priority Data

Nov. 5, 1992 [KR] Rep. of Korea ............... 92/21646

[51] Int. Cl.⁶ .............................................. B60R 13/04
[52] U.S. Cl. ..................................... 296/210; 296/213
[58] Field of Search .................. 296/210, 213, 93

[56] References Cited

U.S. PATENT DOCUMENTS

| | | | |
|---|---|---|---|
| 4,410,211 | 10/1983 | Kloppe et al. | 296/213 |
| 4,618,181 | 10/1986 | Tokuda et al. | 296/213 X |
| 4,792,180 | 12/1988 | Jacobsen et al. | 296/213 X |
| 4,834,448 | 5/1989 | Sakamoto et al. | 296/210 |
| 4,930,279 | 6/1990 | Bart et al. | 296/213 X |
| 5,013,083 | 5/1991 | Yada et al. | 296/213 |

*Primary Examiner*—Joseph Pape
*Attorney, Agent, or Firm*—Kenyon & Kenyon

[57] ABSTRACT

Roof molding assembly structure for an automobile comprising a clip having several elastic pieces and two engaging protrusions, one of the elastic pieces supporting the under surface of the roof molding, the second elastic piece being contacted on the bottom surface of the fitting groove, and the third elastic piece being contacted on the side wall of the fitting groove; and a roof molding having two wings downwardly protruded from the both longitudinal ends thereof respectively. The inner end portion of a roof side panel is vertically raised and horizontally curved for securing the third elastic piece of the clip.

1 Claim, 4 Drawing Sheets

ROOF MOLDING ASSEMBLY STRUCTURE FOR AN AUTOMOBILE

BACKGROUND OF THE INVENTION

The present invention relates to a roof molding assembly structure for an automobile, particularly to the molding of the assembly engaged with the roof panel of an automobile where the molding is not deformed and/or disengaged from the molding fitting groove of the roof panel by solar heat.

FIG. 5 shows one prior art roof molding assembly structure for an automobile. As shown in FIG. 5, the roof molding assembly structure comprises a roof molding 101, a clip 102 on which the roof molding 101 is covered, having a leg 103 downwardly protruded from the clip 102, and a support member 104 having two resilient fingers 105. The roof molding 101 is installed into a fitting groove 106 formed along a joint line 107 joining a roof panel 108 to a roof side panel 109 of an automobile roof. The roof molding 101 is supported in the fitting groove 106 by means of the clip 102 and the support member 104. Then, the support member 104 is fixed in the fitting groove 106 with a fixing stud 110. The fixing stud 110 is welded on the bottom surface 111 of the fitting groove 106. The welding operation of the fixing stud 110 is very difficult because the width of the fitting groove 106 is narrow. Furthermore, since the clip 102 is made of resin, under the condition that hot heat is applied on the roof panel 108 and the roof side panel 109 which are made of metal, in the height of summer, the clip 102 is deformed with the hot heat transferred from the roof panel 108 and roof side panel 109 through the support member 104 made of metal. As a result, the leg 103 of the clip 102 is disengaged from the resilient finger 105 of the support member 104.

Another prior art roof molding for an automobile and clip for securing the roof molding to the automotive roof is disclosed in U.S. Pat. No. 5,013,083.

According to this patent the roof molding is engaged with the automotive roof by means of resilient leg members bonded to the lower surface of the roof molding, and a clip for securing the end portion of the roof molding. Then the resilient leg members of the roof molding made of resin are elastically inserted between both side walls of the fitting groove and directly contacted with both side walls of the fitting groove. Therefore, the resilient leg members also can be easily deformed by the solar heat transferred through the side walls of the fitting groove from the roof panel of the automobile, and as a result, the roof molding is disengaged from the fitting groove.

SUMMARY OF THE INVENTION

It is an object of the present invention to provide a roof molding assembly structure for an automobile not being easily deformed and/or disengaged from the molding fitting groove of the roof, when hot solar heat is applied on the automotive roof.

According to the present invention, there is provided a roof molding assembly structure for an automobile comprising a roof molding for covering the opening end of a fitting groove between a roof panel and a roof side panel and a clip for supporting the roof molding in the fitting groove; the roof molding having two wings downwardly protruded from both longitudinal ends of the roof molding respectively, each end portion of the wings being horizontally curved therefrom; the clip having two first elastic pieces longitudinally protruded from both ends of the body thereof and elastically supporting the under surface of the roof molding, the second elastic piece transversely protruded from the bottom end of the clip body and elastically contacted on the bottom surface of the fitting groove, two third elastic pieces downwardly protruded and horizontally curved from the clip body and elastically contacted on the side wall of the fitting groove, and two engaging protrusions transversally protruded from the top of both ends of the clip body for securing the roof molding by inserting the wings under the protrusions formed in the middle portion of the third elastic piece; the inner end of the roof side panel having a supporting piece vertically raised and horizontally curved for securing the third elastic piece of the clip.

The present invention will become more fully apparent from the description as it proceeds in connection with the drawings.

DETAILED DESCRIPTION OF THE PREFERRED EMBODIMENT

Figure 1:
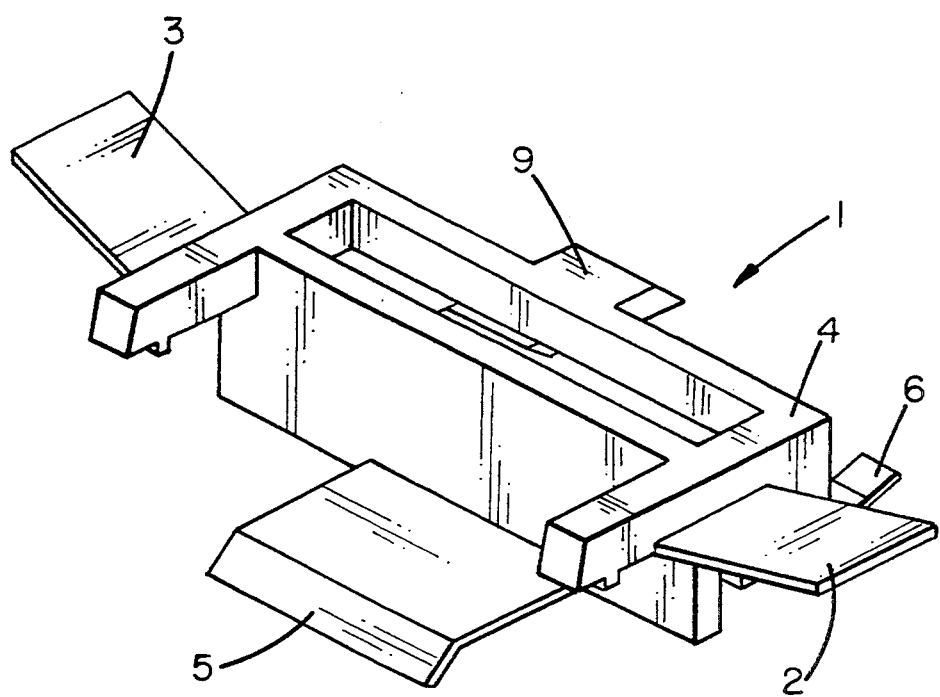
FIG. 1 is a perspective view of a clip according to the present invention.
Figure 2A:
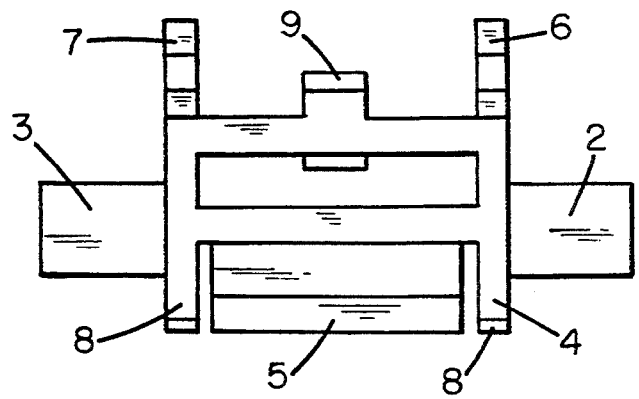
FIG. 2 (a) is a plan view of the clip shown in FIG. 1; (b) is a front elevation view of the clip shown in FIG. 1; (c) is a side elevation view of the clip shown in FIG. 1.
Figure 2B:
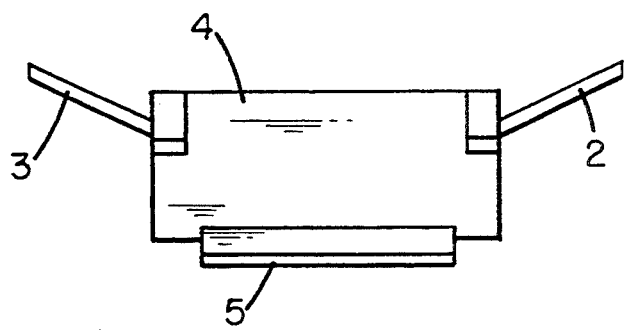
Figure 2C:
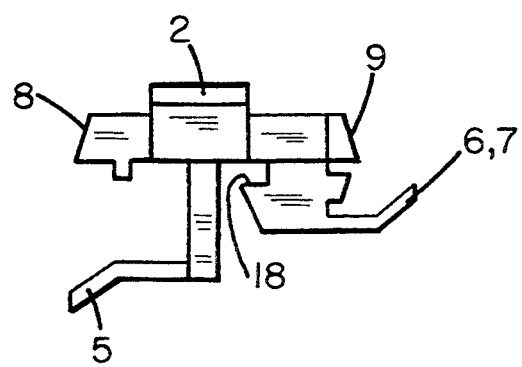

Referring to FIG. 1 and FIG. 2 shown therein is a clip according to the present invention.

The clip 1 has a several elastic pieces. Two first elastic pieces 2, 3 are longitudinally protruded from both ends of the clip body 4. The second elastic piece 5 is transversely protruded from the bottom end of the clip body 4. Two third elastic pieces 6, 7 are downwardly protruded at right angles and horizontally curved from the clip body 4.

The clip 1 also has two engaging protrusions 8, 9. The engaging protrusion 8, 9 are transversally protruded from the top of both ends of the clip body 4.

Figure 3:
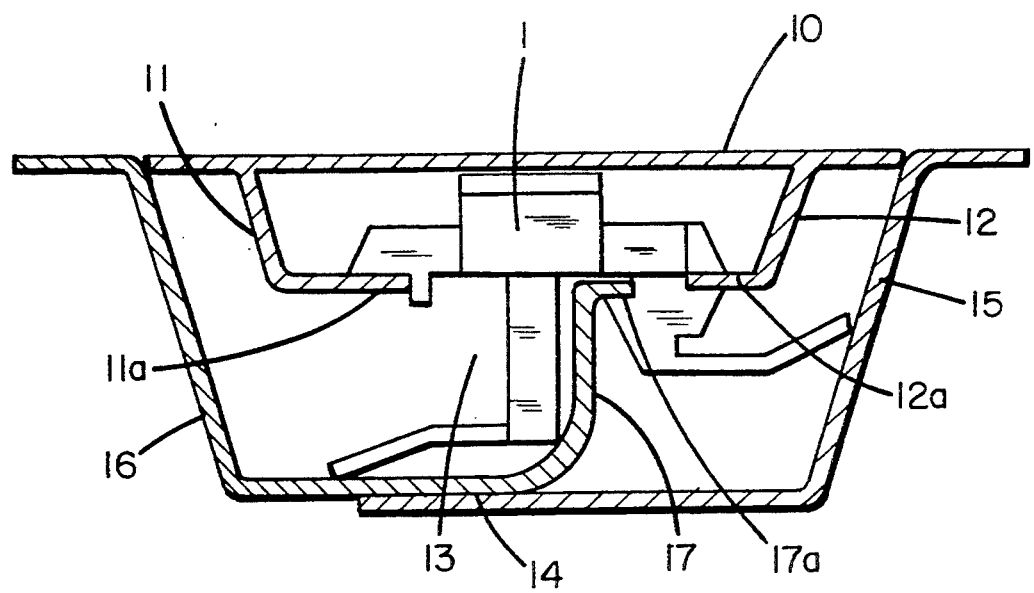
FIG. 3 is a transversal section view of the roof assembly structure for an automobile according to the present invention.
Figure 4:
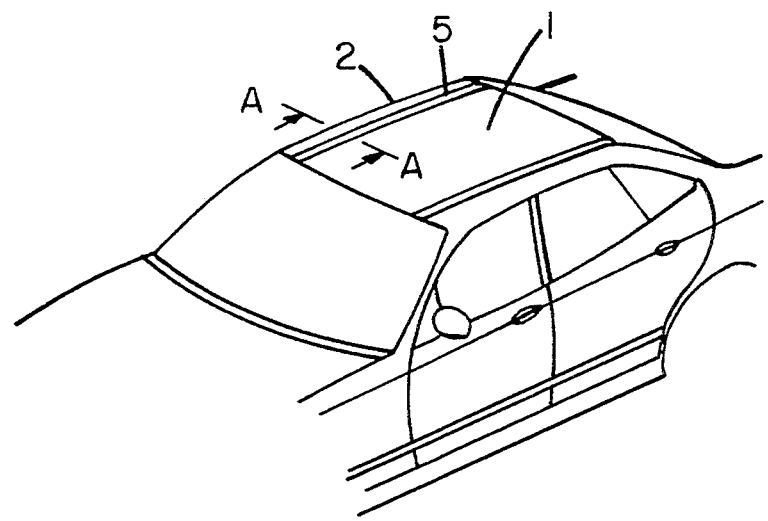
FIG. 4 is a schematic perspective view of an automobile mounted with a roof molding.
Figure 5:
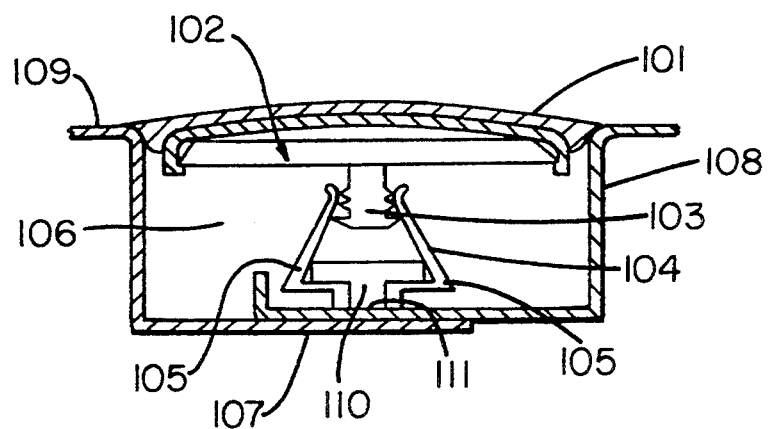
FIG. 5 is a transverse section view of an conventional roof molding assembly structure.

As shown in FIGS. 2 and 3. A roof molding 10 is engaged with the clip 1. The roof molding 10 has two engaging wings 11, 12 which are downwardly protruded from both ends of the molding body. Each end portion 11a, 12a of the wings 11, 12 is horizontally curved therefrom so as to form a hook for engaging the roof molding 10 with the clip 1.

The clip 1 and the roof molding 10 are made of resin, therefore they are elastic owing to its physical characteristics.

A fitting groove 13 is formed along a joint line 14 joining a roof panel 15 to a roof side panel 16 of an automatic roof.

The inner end of the roof side panel 16 is provided with a supporting piece 17 vertically raised and horizontally curved in the fitting groove 13.

As shown in FIG. 3, the clip 1 is firstly engaged with the roof molding 10. At this case, both horizontal portions 11a, 12a of the wings 11, 12 are engaged with the engaging protrusions 8, 9 of the clip 1 respectively. The pre-assembled structure of the clip 1 and the roof molding 10 is inserted into the fitting groove 13.

Then, the second elastic piece 5 is elastically biased on the bottom of the fitting groove 13 and a protrusion 18 formed in the middle portion of the vertical part of the third elastic piece 6 is engaged with the horizontal portion 17a of the supporting piece 17.

Furthermore, the third elastic piece 6 is elastically biased on the side wall of the fitting groove 13.

Additionally, the first elastic pieces 2, 3 elastically support the roof molding 10.

As described in the above, since the several elastic pieces 2, 3, 5, 6, 7 of the clip 1 are elastically biased on the bottom surface and the side wall of the fitting groove 13 and the roof molding 10 respectively and the protrusion 18 of the third elastic pieces 6, 7 is tightly engaged with the horizontal portion 17a of the supporting piece 17, the roof molding assembly structure according to the present invention cannot be easily disengaged from the fitting groove 13.

Moreover, even if hot solar heat in summer is applied on the automotive roof, the hot heat cannot be transferred to the clip. Therefore the clip is not deformed by the hot solar heat.

Additionally, the roof molding assembly structure according to the present invention need not be welded in the narrow fitting groove but can by easily assembled by simple operation.

What is claimed is:

1. A roof molding assembly structure comprising a roof molding for covering the open end of a fitting groove formed along a joint line joining a roof panel to a roof side panel of an automobile, which fitting groove thereby has a bottom surface and side wall, and a clip for supporting the roof molding in the fitting groove, wherein the roof molding includes an upper surface and two longitudinal ends each including a downwardly protruded wing which curves inward and generally parallel to the upper surface, thereby defining an inner surface;

the clip includes a body with a top portion having two opposing ends in a longitudinal dimension each including a first elastic protruding piece in contact with and supporting the inner surface of the roof molding, a bottom portion including a second elastic piece protruding transversely in a first direction and elastically contacting the bottom surface of the fitting grove, two third elastic pieces protruding downwardly from the top portion of the clip body and curved outwardly in a direction generally opposite the first direction and elastically contacting the side wall of the fitting groove, two engaging members protruding transversely from the top portion of the body which secure the roof molding wherein the downwardly protruded wings of the roof molding are inserted under the engaging members; and the roof side panel includes a vertical supporting piece which is curved horizontally to secure the third elastic pieces in the fitting grove.

* * * * *